(12) United States Patent
Brumme et al.

(10) Patent No.: US 7,770,202 B2
(45) Date of Patent: Aug. 3, 2010

(54) CROSS ASSEMBLY CALL INTERCEPTION

(75) Inventors: Christopher W. Brumme, Mercer Island, WA (US); Vance Morrison, Kirkland, WA (US); Sebastian Lange, Seattle, WA (US); Gregory D. Fee, Seattle, WA (US); Dario Russi, Redmond, WA (US); Simon Jeremy Hall, Seattle, WA (US); Mahesh Prakriya, Redmond, WA (US); Brian F. Sullivan, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1309 days.

(21) Appl. No.: 10/771,653

(22) Filed: Feb. 3, 2004

(65) Prior Publication Data
US 2005/0172133 A1 Aug. 4, 2005

(51) Int. Cl.
*G06F 17/00* (2006.01)
*H04L 29/06* (2006.01)

(52) U.S. Cl. .......................... 726/1; 713/182
(58) Field of Classification Search ................. 713/182; 726/1
See application file for complete search history.

(56) References Cited

U.S. PATENT DOCUMENTS

| | | | | |
|---|---|---|---|---|
| 4,430,699 A | * | 2/1984 | Segarra et al. | 709/230 |
| 5,870,588 A | * | 2/1999 | Rompaey et al. | 703/13 |
| 6,076,167 A | * | 6/2000 | Borza | 726/5 |
| 6,614,782 B1 | * | 9/2003 | Wehrend et al. | 370/352 |
| 7,266,677 B1 | * | 9/2007 | Bromley et al. | 713/1 |
| 2003/0041267 A1 | * | 2/2003 | Fee et al. | 713/201 |
| 2004/0059941 A1 | * | 3/2004 | Hardman et al. | 713/201 |

* cited by examiner

*Primary Examiner*—Kambiz Zand
*Assistant Examiner*—Jason K Gee
(74) *Attorney, Agent, or Firm*—Lee & Hayes, PLLC (57) ABSTRACT

A host intercepts calls between two executables and determines whether the calls are permissible according to the host's security model which can be identify based, such as user identity based—for instance, mapping access rights within a specific data base user context to database object access. Such an identity security model differs from a common language runtime security model where managed code uses Code Access Security to prevent managed assemblies from performing certain operations. Managed assemblies registered with the host are host objects from the host's perspective for which access rights can be defined via security rules, such as are defined for individual user identities. A host can decide access between managed executables based on the host's identity based access rules by trapping any cross assembly calls and deciding whether such calls should proceed or be blocked from taking place based on the corresponding identity security settings.

26 Claims, 5 Drawing Sheets

CROSS ASSEMBLY CALL INTERCEPTION

TECHNICAL FIELD

The present invention relates generally to an environment in which clients access a server, and more particularly to a managed execution environment hosted in a server that compiles managed code into native code for execution by a common language runtime via the server's operating system.

BACKGROUND

An application program interface (API) for a network platform can be used by developers to build Web applications and services. One such API is the NET™ platform created by Microsoft Corporation of Redmond, Wash., USA. The NET™ platform is a software platform for Web services and Web applications implemented in a distributed computing environment. The .NET™ platform allows integration of a wide range of services that can be tailored to the needs of the user. As used herein, the phrase application program interface or API includes traditional interfaces that employ method or function calls, as well as remote calls (e.g., a proxy, stub relationship) and SOAP/XML invocations. The .NET™ platform uses a framework that includes the 'Common Language Runtime' (CLR). Additional information regarding the basics of the .NET™ Framework can be found in a number of introductory texts, such as Pratt, Introducing Microsoft .NET, Third Edition, Microsoft Press, 2003.

The CLR is the heart of the Microsoft NET™ Framework and provides the execution environment for all NET code. Thus, code that is built to make use of the CLR, and that runs within the CLR, is referred to as "managed code." The CLR provides various functions and services required for program execution, including just-in-time (JIT) compilation, allocating and managing memory, enforcing type safety, exception handling, thread management and security. The CLR is loaded upon the first invocation of a .NET™ routine. Because managed code compiles to native code prior to execution, significant performance increases can be realized in some scenarios. Managed code uses Code Access Security (CAS) to prevent assemblies from performing certain operations.

When writing managed code, the deployment unit is called an assembly which is a collection of one or more files that are versioned and deployed as a unit. An assembly is the primary building block of a NET™ Framework application. All managed types and resources are contained within an assembly and are marked either as accessible only within the assembly or as accessible from code in other assemblies. An assembly is packaged as a dynamic link library (DLL) or executable (EXE) file. While an executable can run on its own, a DLL must be hosted in an existing application.

Within any host, access rights for calls between assemblies should be defined and limited via security rules to prevent malicious code from causing problems. An example of an environment in which a host should intervene upon the occurrence of a call from one assembly to another is in the case of a cellular telephone (cell phone) that is '.NET' enabled. Being NET enabled, the cell phone can run managed code. It would be desirable to configure the cell phone to enforce a rule that any cell phone application can talk to the cell phone platform assemblies that are provided as common cell phone services to any cell phone application. This rule may also enforce a provision that no cell phone application can call any another cell phone application. As such, the rule requires that cell phone applications are to be treated as complete sandboxes. By trapping cross assembly calls, cross assembly calls are prevented from one cell phone application assembly to another cell phone application assembly until a call back has been made back to the platform assembly for common cell phone services to verify permissions for the call. Example cell phone applications are a billing application and a ring or tone application. Suppose that a tone application has been downloaded by one cell phone and contains malicious code. The user of the cell phone which has the malicious code shares the tone application among several different cell phone users. In this case, the malicious code can stage an attack by using an assembly to call into an assembly of the billing application of one of the cell phones to which the tone application was shared. Once the calling assembly with the malicious code has gained access to the callee assembly in the billing application, the assembly with the malicious code in the tone application can make illegal charges against that user's cell phone billing account. Accordingly, it would be an advance in the art to provide cross assembly call interception that allows calls from one application to be made into common platform services, but that prohibits an application from interfering with the execution of any other application.

Another example of a host is a server that hosts an object-oriented database, where the server has a security model that is user identity based. In contrast, the security model for the CLR bases access rights to a protected resource on Code Access Security (CAS), not on user identity. Managed assemblies registered with the host server are server objects from the host's perspective. Access rights for these server objects can be defined and limited via security rules defined for individual user identities or roles. Host servers therefore must be given a way to allow or disallow access from one managed assembly to another based on the host server's user identity based access rules. It would be an advance in the art to provide a way that allows host servers to allow or disallow access from one managed assembly to another (cross-assembly calls) based on the host server's user identity based access rules, where such cross-assembly calls meet both CAS permission demands as well as user ID permissions governing access from one server object to another.

SUMMARY

In some implementations, a server is provided that has an identity based security access permission model that maps access rights for a specific database to access rights for a server object. Server objects are registered assemblies of the server. The server, for instance, can host an object-oriented database. The server compiles the registered assemblies in managed code into native code that is executed by a common language runtime via the server's operating system. The host can intercept calls from one assembly to another and can make a trust decision for such calls based on user identity based security rules. The identity based security access permission model can be based upon a user identity, but need not be limited to being based upon user identity.

BRIEF DESCRIPTION OF THE DRAWINGS

A more complete understanding of the implementations may be had by reference to the following detailed description when taken in conjunction with the accompanying drawings wherein.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

An assembly defines a security boundary. The Common Language Runtime (CLR) implements a Code Access Security (CAS). What the CLR-based code in the assembly is allowed to do depends on an intersection of the permissions requested and the permissions granted that are in effect at execution time. CAS security allows the CLR to regulate what a particular assembly is allowed to do based on, but not limited to, the assembly's name, who published it, and where it came from. But CAS provides no way to control what an assembly is allowed to do based on the identity of the user on whose behalf the assembly is running.

A server can host a variety of systems, such as a database management system (DBMS). A DBMS is a collection of programs to store, modify, and extract information from a database. One such DBMS is the SQL Server™ DBMS provided by Microsoft Corporation. The SQL Server™ DBMS can respond to queries from client machines formatted in the SQL language.

A server hosting an object-oriented database, such as the SQL Server™ DBMS, will run managed user code in a server process. The running of managed user code in a server process presents some security issues in that the SQL Server security model is user identity based, whereas the CLR security model is code identity based. A requirement that managed code must meet CAS permission restrictions is not always sufficient to guarantee security and other host defined requirements in the server environment. Implementations include a host that has requirements that extend beyond security to requirements that are centered around usefulness for reliability, licensing, and other requirements. Accordingly, the present invention is not limited to security based models. One such case occurs when a call is made from one assembly to another.

An assembly that is registered with the server is considered by the server to be a server object. Access rights for the server objects of a host server can be defined and limited. From the CAS security model perspective of the CLR, access from one assembly to another via publicly available application program interfaces (APIs) is not a security concern so long as CAS permissions are met. Cross assembly access, when taking place within the same application domain, is not normally a protected operation. In a user identity security model, access from one server object (such as an assembly) to another (such as another assembly) must be regulated by the specific user identity based permission system. The user identity security model, however, is unknown to the CLR. The user identity security model differs from the CLR security model which bases access rights to a protected resource on CAS.

To avoid security issues, a server hosting an object-oriented database can be given a way to intercept cross assembly calls by using a security model that is user identity based. Accordingly, for each cross assembly call that the host server intercepts, the host server can determine whether the cross assembly (or cross server object) access is permissible given the user identity based security settings at the host server.

As a further illustration, any calls from an assembly 'A' to an assembly 'B' via well defined publicly accessible invocation routes (public or static methods on assembly 'B' for instance) are not considered a priori a security issue in the CLR security mode. This is because assemblies themselves do not inherently constitute a protected resource in the CLR security model. Rather, only specific types and the implementation of an assembly could make part or all of an assembly a container that needs additional protection. For servers, such as those that host an object-oriented database, administrators can define what user contexts may reference or execute code in assembly 'B'. Thus, the access to assembly 'B' itself is already access to a protection-worthy resource from the server's security model's perspective. Accordingly, implementations provide a cross assembly call interception mechanism that uses an access rule mechanism that can determine whether or not cross assembly calls are to be permitted.

The access rule mechanism is used by the interceptor of the calls to determine whether or not the call will be permitted. The particular access rule mechanism that is used by the interceptor of the calls can be quite varied. One such access rule mechanism, among many others that might be used, could be a user identity based security access permission model. This model maps access rights for a specific data base within a user context to server object access rights. The foundation for user identity based security is a principal object. This object contains both the identity of a user and the roles to which the user belongs. Thus, user identity security models are also referred to as role-based security models. A user's Identity (ID) is indicated by an identity object. As stated above, however, a user ID for a security based model is only one of many different criteria that can be used by an interceptor of a call to determine whether or not the call will be permitted. Accordingly, an 'identifier' is used herein to convey the concept of a model that is broader than a user ID based model.

Exemplary Network Environment

Figure 1:
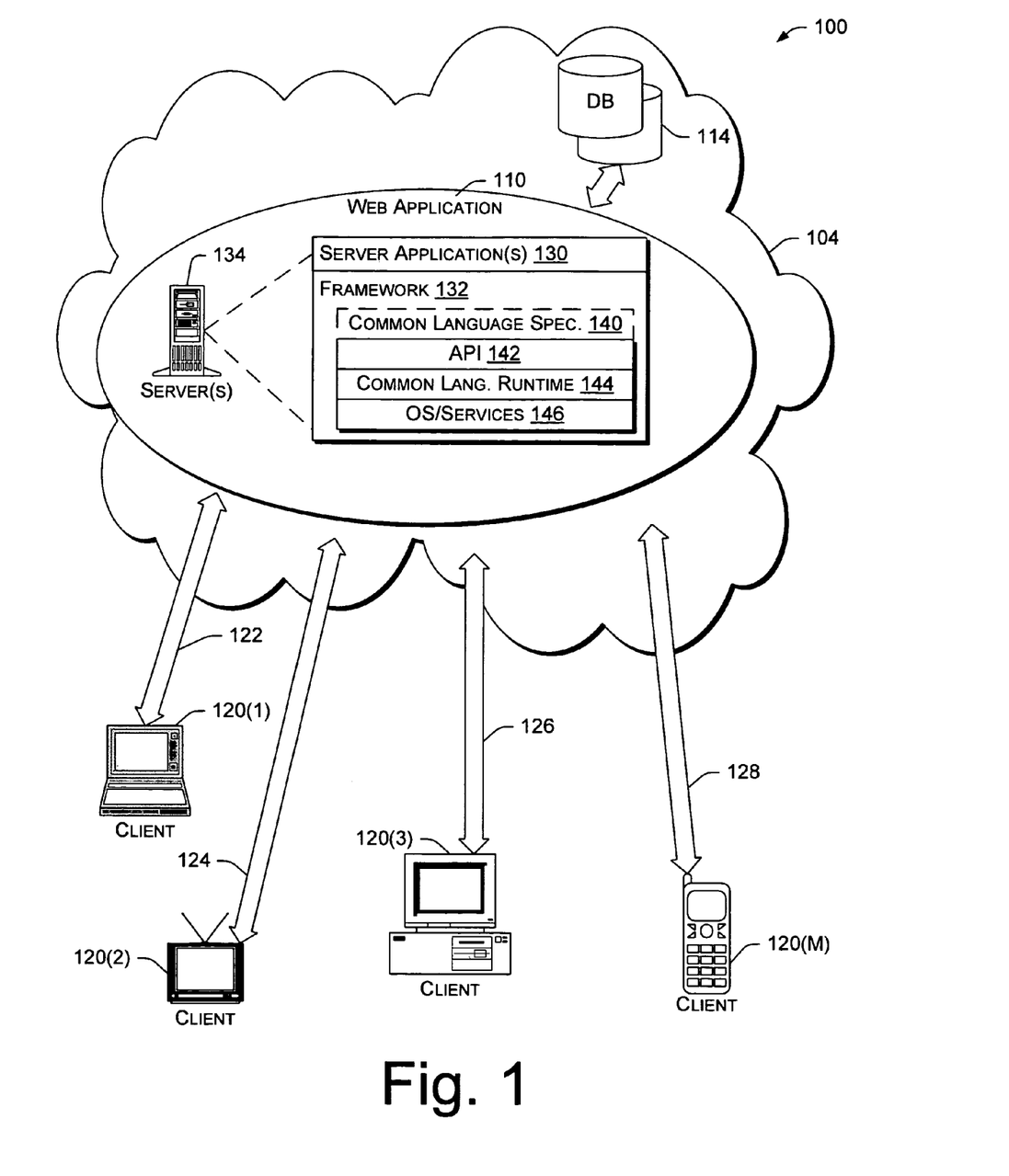
FIG. 1 illustrates a network architecture in which clients access Web services provided by one or more servers over the Internet using conventional protocols, where each server runs managed user code in a server process that can access an object-oriented database.

FIG. 1 shows a network environment 100 in which a network platform, such as the .NET™ platform, may be implemented. The network environment 100 includes representative Web services accessible directly by a software application, such as Web application 110. Each Web service is illustrated as including one or more servers 134 that execute software to handle requests for particular services. Such services often maintain databases 114 that store information to be served back to requesters. For instance, databases 114 can include an object-oriented database. Web services may be configured to perform any one of a variety of different services and can be combined with each other and with other applications to build intelligent interactive experiences.

The network environment 100 also includes representative client devices 120(1), 120(2), 120(3), . . . , 120(M) that utilize the Web application 110 (as represented by communication links 122-128). The client devices, referenced generally as number 120, can be implemented many different ways. Examples of possible client implementations include, without limitation, portable computers, stationary computers, tablet PCs, televisions/set-top boxes, wireless communication devices, personal digital assistants, video gaming consoles, printers, photocopiers, and other smart devices.

The Web application 110 is an application designed to run on the network platform when handling and servicing requests from clients 120. The Web application 110 is composed of one or more software applications 130 that run atop a programming framework 132, which are executing on one or more servers 134 or other computer systems. A portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages and encapsulates the underlying operating system and object model services. The framework 132 is a multi-tiered architecture that includes an application program interface (API) layer 142, a common language runtime (CLR) layer 144, and an operating system/services layer 146. This layered architecture allows updates and modifications to various layers without impacting other portions of the framework 132. A common language specification (CLS) 140 allows designers of various languages to write code that is able to access underlying library functionality.

The API layer 142 presents groups of functions that the applications 130 can call to access the resources and services provided by layer 146. The framework 132 can be configured to support API calls placed by remote applications executing remotely from the servers 134 that host the framework 132. An application residing on client 120(m) can use the API functions by making calls directly, or indirectly, to the API layer 142 over the network 104. The framework 132 may also be implemented at the clients identically to server-based framework 132, or modified for client purposes. Alternatively, the client-based framework may be condensed in the event that the client is a limited or dedicated function device, such as a cellular phone 120(M), personal digital assistant, handheld computer, or other communication/computing device.

Server Environment

Figure 2:
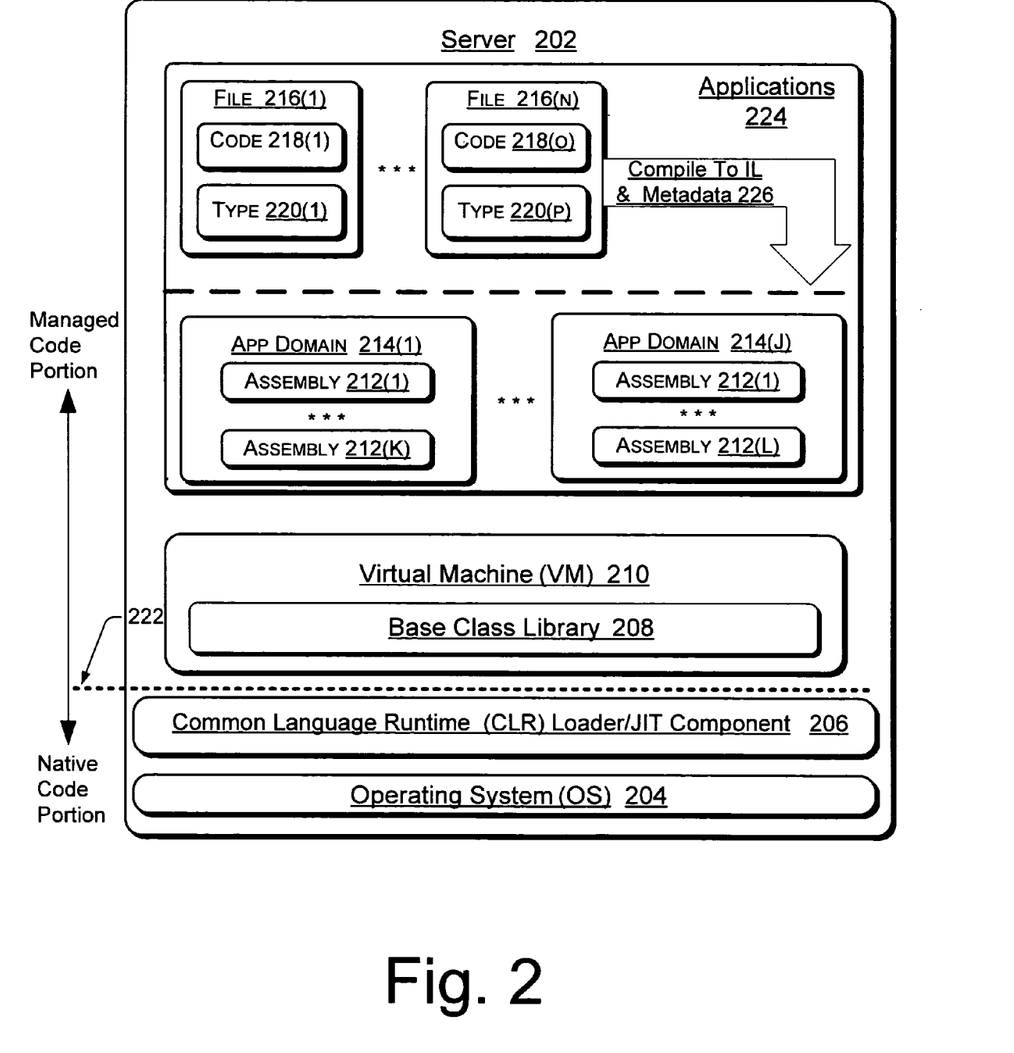
FIG. 2 illustrates one embodiment of a server environment, such as in FIG. 1, that integrates a virtual machine (VM) in a managed code portion, where the server environment has a managed code portion that includes a base class library and an exemplary software compilation of files having different file types into one or more assemblies, where each assembly can be placed into an application domain for execution, and where the server environment has a native code portion that includes a Common Language Run Time and an operating system.

FIG. 2 shows an implementation that illustrates a server 202 utilizing a virtual machine (VM) 210 having architecture to run on different platforms. VM 210 is stacked on an interface 222 between a managed code portion and a native code portion. Accordingly, interface 222 can be an interface to different operating systems and different applications.

The native code portion includes an operating system 204. Over the operating system 204 is a module 206 that include a Common Language Runtime (CLR) loader and a Just-In-Time (JIT) compiler component The managed code portion includes VM 210, files 216(n), and application (app) domains (j) 214. Each file (n) has user code 218(o) that can be coded in a variety of different programming languages.

FIG. 2 illustrates an exemplary arrow 226 where files 216 having different file types 220(p) are compiled into Intermediate Language (IL) and metadata contained in one or more managed assemblies 212 (1-K), (1-L) within respective application domains 214 (1-J). As such, this compilation 226 enables the files 216 of arbitrary (and possibly expanded/extended) types 220 to be compiled 226 into at least one managed assembly 212. Each managed assembly can be placed within one app domain 214 in order to be executed.

As illustrated, each file 216(n) is compiled and includes code 218(o) of respective type 220(p). It should be understood that each file 216(n) may not physically include its code 218(o). However, the source code for each code 218(o) is inferable or otherwise derivable from the contents of its file 216(n). Although a finite number of files 216 and types 220 are illustrated in and/or indicated by FIG. 2, any number of files 216 and types 220 may be involved in compilation 226. Compilation 226 may comprise a pluggable build architecture that interfaces with modules assigned to files 216. These modules may be tailored to the corresponding arbitrary file types 220 of files 216 in order to facilitate a compilation 226 of their code 218 into a target managed assembly 212.

In general, code files in a .NET™ Framework environment may be compiled into assemblies. Assemblies may exist as a unit independent of application domains. The assemblies must be loaded into one application domain, and may be loaded into any number of application domains, to be executed. An assembly, such as a dynamic link library (DLL), is compiled independently of being run. The compiled DLL is then loaded on demand into any number of processes. Assemblies are typically broken into many units of code, typically called methods that are units of compilation. Each method may have zero or more call sites, and each of these may or may not be cross-assembly calls. For further information, as mentioned above, the reader is referred to the basics of the .NET™ Framework in any of a number of introductory texts, such as Pratt, Introducing Microsoft .NET, Third Edition, Microsoft Press, 2003.

The CLR loader of component 206, which is stacked upon the server's operating system 204, operates in the native code portion as the execution engine for the virtual machine 210. The JIT aspect of component 206 compiles managed assemblies 212 (1-K), (1-L) within respective app domains 214 (1-J) into native code to be executed by the CLR loader of component 206. Accordingly, server 202 provides a virtual machine 210 operating in a managed code portion for executing applications 224.

Figure 3A:
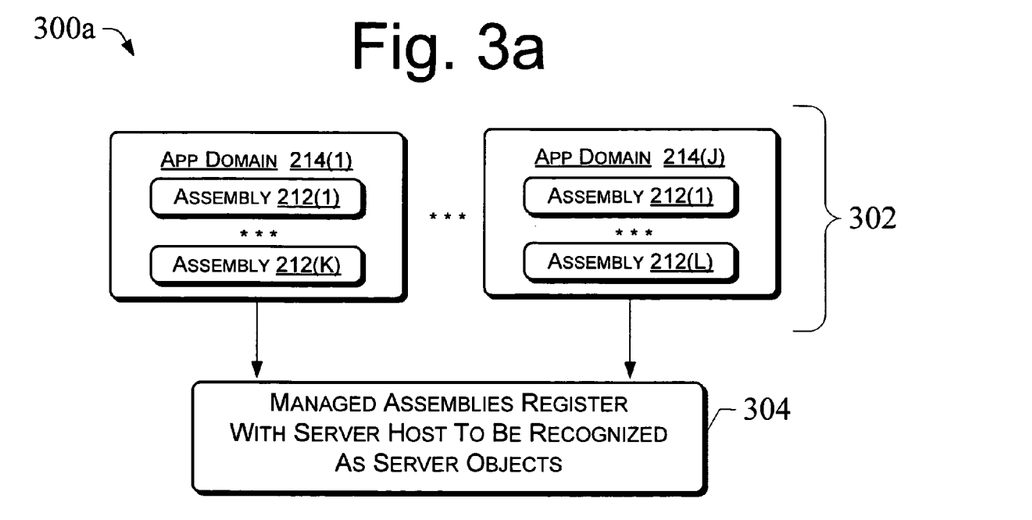
FIG. 3a is a flowchart for an implementation of a process in which a plurality of assemblies are registered as server objects with a host server.

FIG. 3a illustrates an exemplary process 300a where server objects are registered with a host server. Each app domain (j) 214 includes one or more managed assemblies (k, l) 212 as shown at block 302. Each managed assembly (k, l) 212 is registered as a server object with the host server at block 304 of process 300a.

Figure 3B:
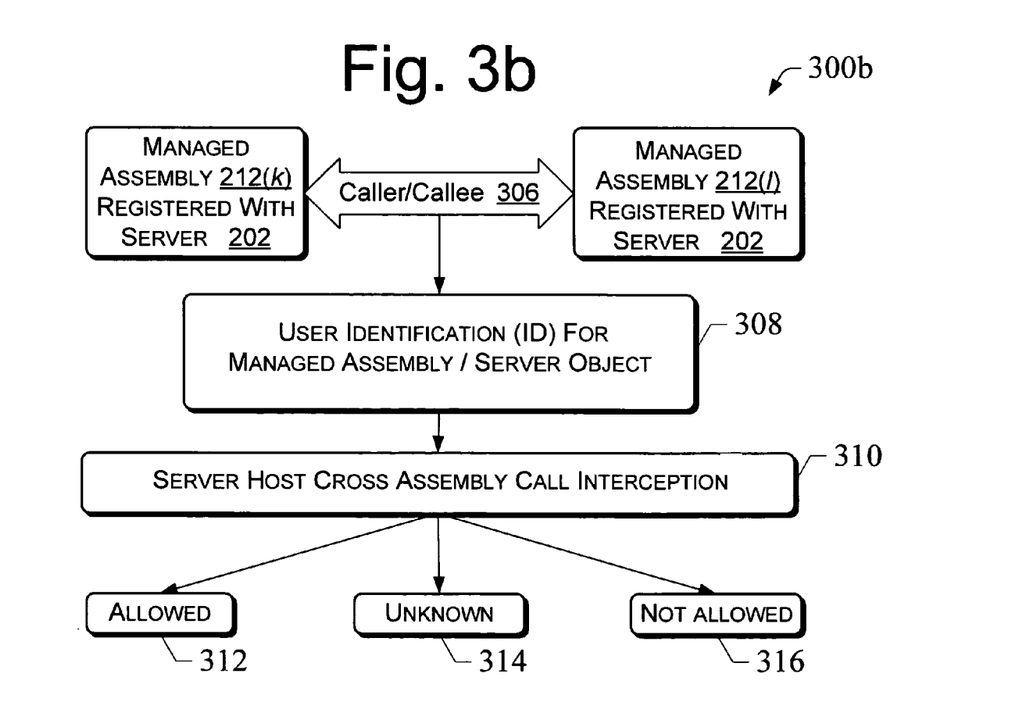
FIG. 3b is a flowchart for an implementation in which a caller assembly from one application domain calls to a callee assembly in another application domain, which call is intercepted by a host server, where the intercepted call is examined according to a user identification (ID) based security access permission model to determine access, and where both callee and caller are server objects registered with the host server.

FIG. 3b illustrates a process 300b for intercepting a call from a calling managed assembly, where the call crosses to a callee managed assembly. The intercepted call is checked to verify that the caller has access privileges to protected resources of the callee. Stated otherwise, calls between server objects are checked for access privileges on a user identity based security access permission model. At arrow 306 of process 300b, a cross assembly call between caller and callee is initiated. The caller and callee can be, by way of example and not by way of limitation, from managed assembly 212(k) to managed assembly 212(l), each of which as been registered as a server object with server 202. At blocks 308-310 of process 300b, the host server intercepts the call from managed assembly 212 (k) to managed assembly 212 (l). The interception is accompanied by a verification of either or both of the user identifications (IDs) of managed assemblies 212 (k, l) to see if managed assembly 212 (k) has access privileges to managed assembly 212(l). The host server's verification can make one of three (3) decisions. The verification decision can be an allowance 312 of the cross assembly call and the verification decision can be to not allow 316 the cross assembly call. The third type of verification decision can be that the host server can not determine whether the cross assembly call is permissible. In this case, an unknown 314 decision would be rendered. The unknown 314 decision would result in a postponement of the verification. The host server would then be configured to perform the postponed verification at a time that is prior to the native code being executed (i.e., at run time), where the native code was compiled from the corresponding caller/callee managed assemblies.

Figure 4:
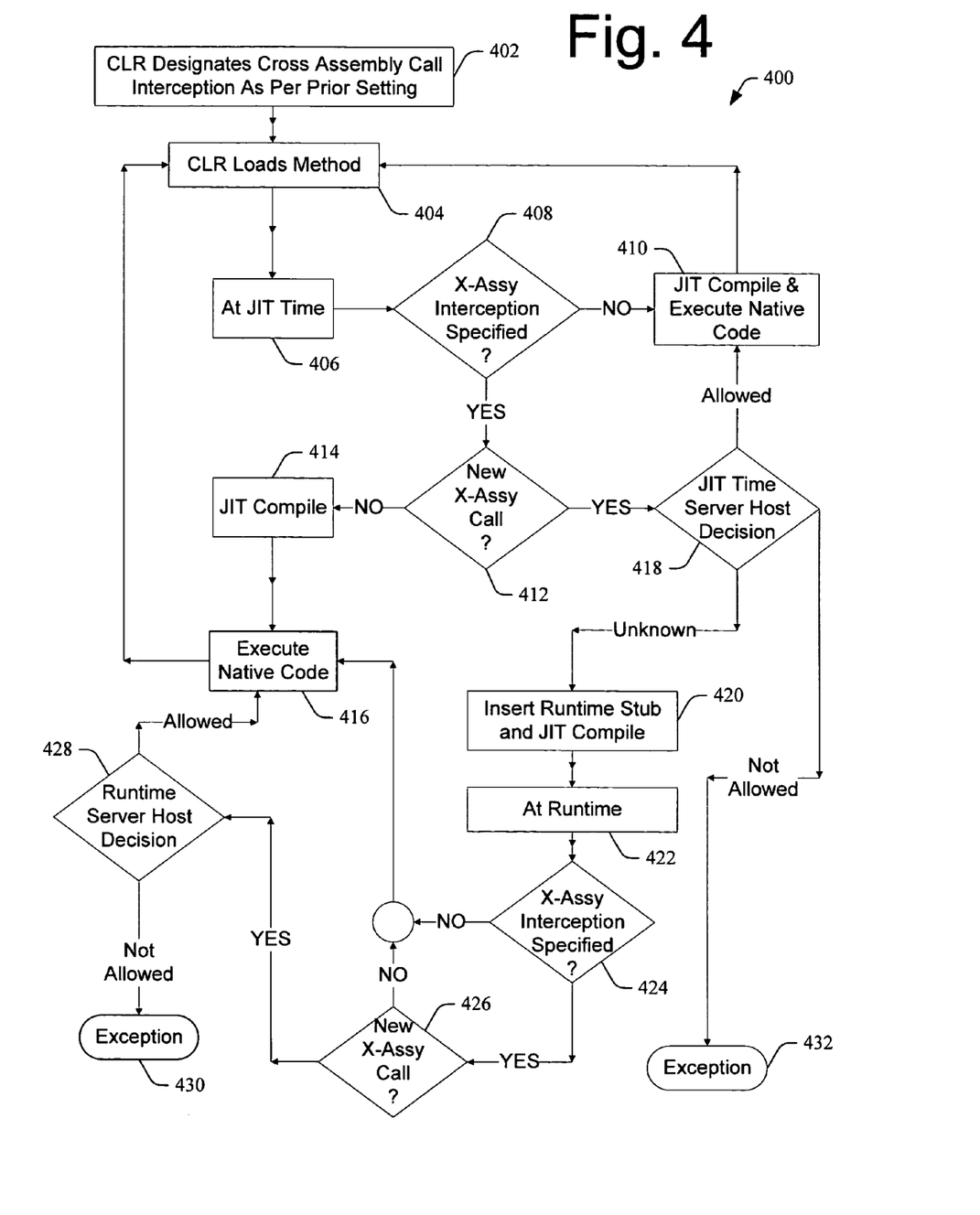
FIG. 4 is a flowchart for an implementation of a process that expands upon the processes of FIGS. 3a-3b.

FIG. 4 presents a flowchart of a process 400 for a host server to perform cross assembly call interception and access verification based upon one or both of the user IDs of corresponding caller/callee managed assemblies. At block 402 of process 400, the Common Language Runtime (CLR) receives a designation that the host server has been preconfigured to require cross assembly interception. Process 400 then proceeds to block 404 where the CLR loads a managed assembly. Process 400 proceeds until Just-In-Time (JIT) compile time for the loaded managed assembly at block 406 and then proceeds to block 408 at which a query is made. The query examines whether the host server has been preconfigured to require cross assembly interception. If not, then process 400 passes control to block 410 where the managed assembly is JIT compiled into native code, the native code is executed by the host server using the CLR, and the process 400 returns to block 404.

If the query at block 408 determines that the host server has been preconfigured to require cross assembly interception, then process 400 passes control to a query 412 that determines whether a new cross assembly call is being made. A new cross assembly call is considered to have occurred when the caller managed assembly is calling a different callee managed assembly and the host server has not previously verified access privileges from caller to callee based upon their respective user IDs. As such, the host server need only verify once that a particular caller may call a specific callee. Once these access privileges have been verified, no further cross assembly interceptions need to be made for calls from the particular caller to the specific callee, thereby realizing host server efficiencies. For example, the verification of the propriety of a call from caller to callee is information that can be cached. This cached information can be used later for any particular pairing of caller and callee for whom the host server had checked permissions previously. The cached information can then be used by the host server to increase its performance by avoiding the steps of cross assembly call interception and permission checking every time previously checked calls are made.

If the query 412 determines that a new cross assembly call is not being made, then process 400 passes control to block 414 where the managed assembly is JIT compiled into native code, the native code is executed by the CLR of the host server at block 416, and the process 400 returns to block 404. If a new cross assembly call is being made, then this result from query 412 moves process 400 to query 418 where a determination is made. The determination at query 418, which is based upon the user ID of the caller and callee managed assemblies, is conducted at JIT time as noted above at block 406. If query 418 determines that that the new cross assembly call is allowed, the process 400 passes control to block 410 where the managed assembly is JIT compiled into native code, the native code is executed by the CLR of the host server, and the process 400 returns to block 404. If query 418 determines, based upon the user IDs of the caller and callee managed assemblies, that the new cross assembly call is not allowed, then an exception is thrown. The throwing of an exception can take any of a variety of forms known to those in the server and object-oriented database arts, such as producing a diagnostic that is readily accessible to server administrators. Following the throwing of the exception, there is a termination 432 of the attempt to make the cross assembly call.

If query 418 determines that is unknown whether the cross assembly call should be permitted, then a runtime stub would be inserted at block 420 to postpone the verification by the host server of the cross assembly call. By way of example, a method within the caller assembly can be pointed to the inserted stub. Then, the inserted stub will be used to make a call back to the host server at the runtime of the corresponding native code. The call back to the host server can be configured to occur only upon an actual call of that method within the caller assembly if the runtime check of that method by host server succeeds.

The circumstances in which there will be a determination that it is unknown whether the cross assembly call should be permitted are based upon the context given in which the call to the host server is being made. When a cross assembly call is discovered during JIT compilation, a call will be made to the host server with the caller and callee assembly references. This will let the host server know that it has been given data, such as the current user context, that may only be accurate during the actual runtime of the invocation. In this case, the inaccuracy of the user context need not be taken into account when making the security decision as to whether the call is legitimate.

Given this constraint, it may be the case that the host server cannot determine at the JIT compilation time of the managed assembly whether the call is legitimate. In this case, the "unknown" decision is returned. With the "unknown decision", the JIT compiler component will insert the appropriate code that will call back the host at the runtime of the cross assembly call. At the runtime, however, the host server must make a decision as to whether the cross assembly call is legitimate—otherwise an exception should be output.

For cross assembly interception and access verifications, some hosting servers require, in addition to the current user context, the current application domain of the caller (e.g., see app domain 214(j) in FIG. 2). To allow unmanaged hosts to query for the current application domain, the APIs for the hosting server can be configured accordingly.

With the insertion of the runtime stub, the managed assembly is compiled into native code. Process 400 then moves from block 420 to block 422 which indicates that the runtime has arrived for the native code corresponding to the caller managed assembly. Process 400 then moves from block 422 to block 424 at which a query is made. The query examines whether the host server has been preconfigured to require cross assembly interception. If not, then process 400 passes control to block 416 where the native code is executed by the CLR of the host server, and the process 400 returns to block 404. If the host server has been preconfigured to intercept cross assembly calls, as determined at block 424, then process 400 moved to the query 426. Query 426 determines if a new cross assembly call is being made. If not, then process 400 passes control to block 416 where the native code is executed by the CLR of the host server, and the process 400 returns to block 404. If the call that is intercepted by the host server is a new cross assembly call, then a runtime decision is made at query 428 by the host server. Query 428, which is based upon the user ID of the caller and callee managed assemblies, is conducted at the runtime of the corresponding native code as noted above with respect to block 422. If query 428 determines that the new cross assembly call is allowed, the process 400 passes control to block 416 where the native code is executed by the CLR of the host server, and the process 400 returns to block 404. If query 428 determines, based upon one or both of the user IDs of the caller and callee managed assemblies, that the new cross assembly call is not allowed, then an exception is thrown. Following the throwing of the exception, there is a termination 430 of the attempt to make the cross assembly call.

A Computer System

Figure 5:
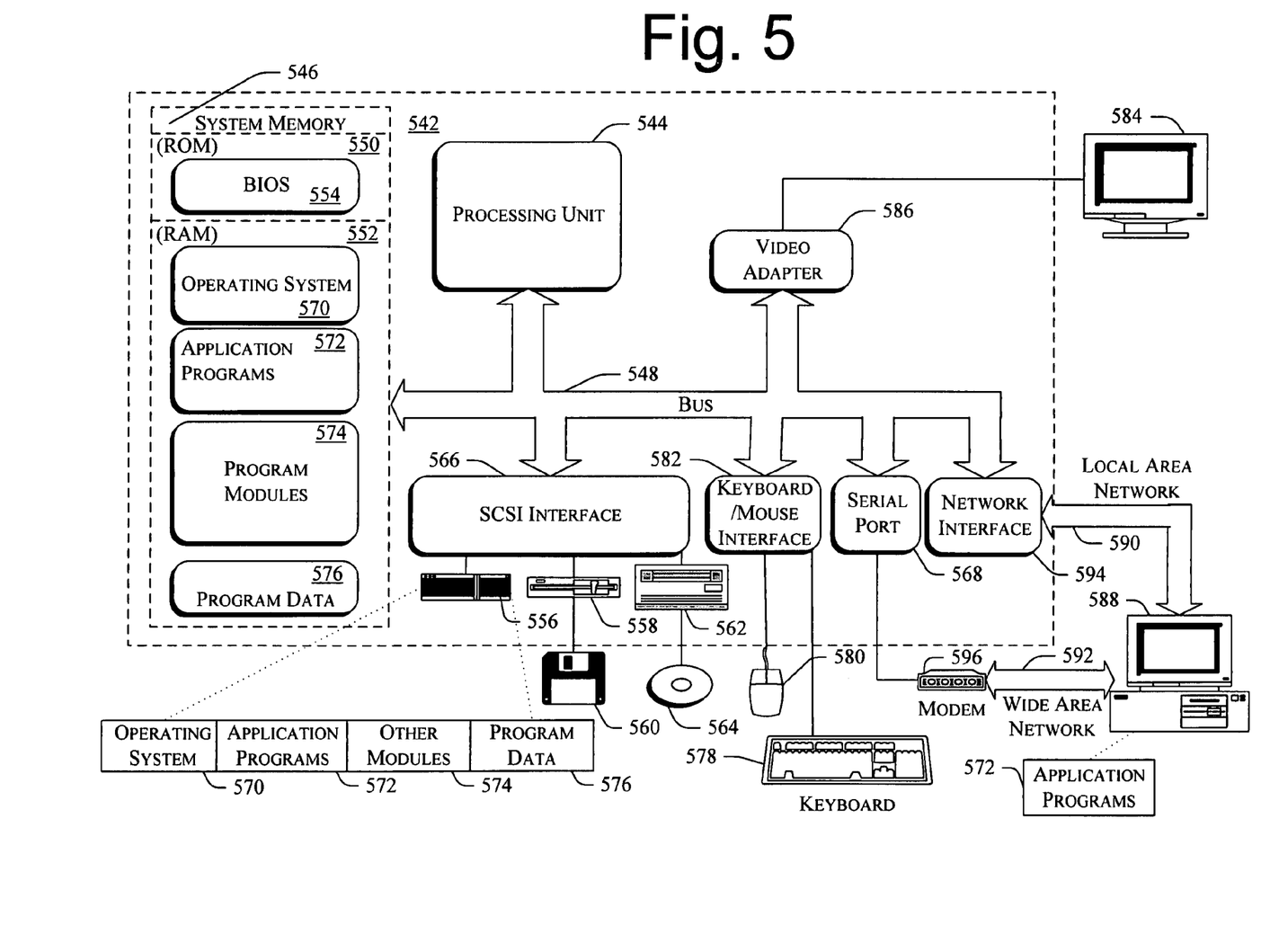
FIG. 5 is a block diagram of an exemplary environment capable of supporting an exemplary server of FIG. 1.

FIG. 5 shows an exemplary computer system that can be used to implement the processes described herein. Computer 542 includes one or more processors or processing units 544, a system memory 546, and a bus 548 that couples various system components including the system memory 546 to processors 544. The bus 548 represents one or more of any of several types of bus structures, including a memory bus or memory controller, a peripheral bus, an accelerated graphics port, and a processor or local bus using any of a variety of bus architectures. The system memory 546 includes read only memory (ROM) 550 and random access memory (RAM) 552. A basic input/output system (BIOS) 554, containing the basic routines that help to transfer information between elements within computer 542, such as during start-up, is stored in ROM 550.

Computer 542 further includes a hard disk drive 556 for reading from and writing to a hard disk (not shown), a magnetic disk drive 558 for reading from and writing to a removable magnetic disk 560, and an optical disk drive 562 for reading from or writing to a removable optical disk 564 such as a CD ROM or other optical media. The hard disk drive 556, magnetic disk drive 558, and optical disk drive 562 are connected to the bus 548 by an SCSI interface 566 or some other appropriate interface. The drives and their associated computer-readable media provide nonvolatile storage of computer-readable instructions, data structures, program modules and other data for computer 542. Although the exemplary environment described herein employs a hard disk, a removable magnetic disk 560 and a removable optical disk 564, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 556, magnetic disk 560, optical disk 564, ROM 550, or RAM 552, including an operating system 570, one or more application programs 572 (such as a the database management system discussed above), cache/other modules 574, and program data 576. A user may enter commands and information into computer 542 through input devices such as a keyboard 578 and a pointing device 580. Other input devices (not shown) may include a microphone, joystick, game pad, satellite dish, scanner, or the like. These and other input devices are connected to the processing unit 544 through an interface 582 that is coupled to the bus 548. A monitor 584 or other type of display device is also connected to the bus 548 via an interface, such as a video adapter 586. In addition to the monitor, personal computers typically include other peripheral output devices (not shown) such as speakers and printers.

Computer 542, which can be a server or a personal computer, commonly operates in a networked environment using logical connections to one or more remote computers, such as a remote computer 588. The remote computer 588 may be another server or personal computer, a router, a network PC, a peer device or other common network node, and typically includes many or all of the elements described above relative to computer 542. The logical connections depicted in FIG. 5 include a local area network (LAN) 590 and a wide area network (WAN) 592. Such networking environments are commonplace in offices, enterprise-wide computer networks, intranets, and the Internet.

When used in a LAN networking environment, computer 542 is connected to the local network through a network interface or adapter 594. When used in a WAN networking environment, computer 542 typically includes a modem 596 or other means for establishing communications over the wide area network 592, such as the Internet. The modem 596, which may be internal or external, is connected to the bus 548 via a serial port interface 568. In a networked environment, program modules depicted relative to the personal computer 542, or portions thereof, may be stored in the remote memory storage device. It will be appreciated that the network connections shown are exemplary and other means of establishing a communications link between the computers may be used.

Generally, the data processors of computer 542 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
one or more processors; and
memory communicatively coupled to the one or more processors, the memory having stored thereon a plurality of instructions that, when executed on the apparatus, configure the one or more processors to implement:
a virtual machine, instantiated in managed code to execute with a runtime loader, for executing a first assembly and a second assembly of one or more files instantiated in the managed code;
the first assembly configured to make a call for access in the managed code to the second assembly in the managed code at Just-In-Time (JIT) compilation time;
a JIT compiler for compiling each of the first assembly and the second assembly into native code for execution as native code, wherein during compilation, based upon a determination by a determining component that it is unknown whether the call from the first assembly to the second assembly should be permitted, the JIT compiler is configured to insert a runtime stub into the call before compiling the first assembly and the second assembly;
an interceptor for intercepting the call from the first assembly to the second assembly at a runtime; and
the determining component, based upon a user identification (ID) for at least one of the first assembly and the second assembly of the one or more files, for determining, at the runtime, access privileges of the first assembly of the one or more files to the second assembly of the one or more files.

2. The apparatus as defined in claim 1, wherein the plurality of instructions configure the one or more processors to further implement:
an execution engine, instantiated in a native code, to execute the virtual machine in runtime; and
an operating system in native code to be executed with one or more of the compiled first assembly and the second assembly.

3. The apparatus as defined in claim 1, wherein the determining component is configured to prevent the access of the first assembly to the second assembly when the determination based upon the ID for at least one of the first assembly and the second assembly is unfavorable based upon predetermined criteria for the respective IDs.

4. The apparatus as defined in claim 1, wherein the determining component is configured to prevent the access of the first assembly to the second assembly when the ID for the first assembly does not match the ID for the second assembly based upon a predetermined match criteria for the respective IDs.

5. The apparatus as defined in claim 1, wherein the determining component is configured to prevent the access of the first assembly to the second assembly when the first assembly is in a first application domain and the second assembly is in a second application domain, and the first and second application domains do not match based upon a predetermined match criteria for application domains.

6. The apparatus as defined in claim 2, wherein:
the determining component is further configured to permit the access of the first assembly to the second assembly when the ID for the first assembly matches the ID for the second assembly based upon a predetermined match criteria for the respective IDs; and
the plurality of instructions configure the one or more processors of the apparatus to further implement:
a Common Language Runtime (CLR) loader in the native code portion to load the compiled native code.

7. The apparatus as defined in claim 1, wherein the determining component is configured to permit the access of the first assembly to the second assembly when previous access to said second assembly by said first assembly had been permitted.

8. The apparatus as defined in claim 7, wherein the previous access had been permitted following a prior determination that was favorable based upon a predetermined comparison criteria for the respective IDs.

9. The apparatus as defined in claim 1, wherein the plurality of instructions configure the one or more processors to further implement:
a verifying component, prior to determining access privileges, for verifying whether the ID is accurate for the first assembly and the second assembly; and
wherein the determining component is configured to:
permit the JIT compiler to compile at least one of the first assembly and the second assembly into native code; and
delay determination of access privileges until the ID is accurate for the first assembly and the second assembly.

10. The apparatus as defined in claim 9, wherein the verifying component is further configured to verify that the ID is accurate for the first assembly and the second assembly at the runtime for the native code.

11. The apparatus as defined in claim 9, wherein the determining component is for further halting the delay at the runtime for the native code.

12. The apparatus as defined in claim 1, wherein the managed code portion further comprises one or more files associated with user code that, when compiled into an intermediate language code and metadata generated by a language compiler, are represented by the first and second assemblies in respective application domains.

13. The apparatus as defined in claim 2, wherein the execution engine in the native code portion comprises a compiler to compile each said assembly into native code for execution by the native code portion.

14. The apparatus as defined in claim 2, wherein the execution engine in the native code portion comprises:
a CLR loader to load the compiled native code for execution by the native code portion.

15. A server comprising:
a virtual machine, instantiated in managed code to execute with a runtime loader, to execute first and second assemblies of one or more files instantiated in the managed code, each of the first assembly and the second assembly being registered as a server object with the server;
a first module to make a call for access by the first assembly to the second assembly at Just-In-Time (JIT) compilation time;
an intercept module to intercept the call from the first assembly to the second assembly;
a second module, based upon user identification (ID) for at least one of the first and second assemblies, to determine access privileges of the first assembly to the second assembly; and
a JIT compiler module, based upon a first determination made at the second module that it is unknown whether the call from the first assembly to the second assembly should be permitted, to perform actions comprising:
inserting a runtime stub into the call; and
compiling the first assembly and the second assembly in the managed code into native code for execution as native code, wherein at runtime when the native code of the first assembly and the second assembly is executed at the server, the second module of the server is configured to make, based upon the user ID for each of the first assembly and the second assembly at the runtime, a second determination of whether the call by the first assembly to the second assembly shall be permitted at the runtime.

16. The server as defined in claim 15, further comprising:
an execution engine, instantiated in a native code, to execute the virtual machine in runtime; and
an operating system in native code to be executed with one or more of the compiled first and second assemblies.

17. A method implemented by a computing device, the method comprising the steps of:
identifying a cross assembly call from a first assembly of one or more of the files instantiated in the managed code to a second assembly of one or more of the files instantiated in the managed code at a Just-In-Time (JIT) compilation time, wherein access privilege of the cross assembly call has not been verified based upon an identification (ID) for at least one of the first assembly and the second assembly of the one or more files;
making, via the computing device, a first determination at the JIT compilation time that it is unknown whether the call from the first assembly to the second assembly should be permitted, wherein the first determination is based upon the ID for at least one of the first assembly and the second assembly;
inserting a runtime stub to the cross assembly call in the managed code to postpone a verification of the cross assembly call at the JIT compilation time, the runtime stub being configured to be used to make a call back at a runtime;
compiling the first assembly and the second assembly in the managed code into native code for execution as native code;
intercepting the cross assembly call at the runtime; and
making, via the computing device, a second determination at the runtime to decide, based upon the ID for at least one of the first and second assemblies at the runtime, whether the call by the first assembly to the second assembly shall be permitted.

18. The method as recited in claim 17, further comprising preventing the access of the first assembly to the second assembly when the second determination based upon the ID for at least one of the first assembly and the second assembly is unfavorable based upon predetermined criteria for the respective IDs.

19. The method as recited in claim 17, further comprising preventing the access of the first assembly to the second assembly when the ID for the first assembly does not match the ID for the second assembly based upon a predetermined match criteria for the respective IDs.

20. The method as recited in claim 17, further comprising preventing the access of the first assembly to the second assembly when the first assembly is in a first application domain and the second assembly is in a second application domain, and the first and second application domains do not match based upon a predetermined match criteria for application domains.

21. The method as recited in claim 17, further comprising permitting the access of the first assembly to the second assembly when the ID for the first assembly matches the ID for the second assembly based upon a predetermined match criteria for the respective IDs.

22. The method as recited in claim 17, further comprising permitting the access of the first assembly to the second assembly when previous access to said second assembly by said first assembly had been permitted.

23. The method as recited in claim 17, further comprising launching a Common Language Runtime (CLR) loader to the first assembly and the second assembly in managed code.

24. The method as recited in claim 17, further comprising verifying that the ID is accurate for the first assembly and the second assembly.

25. The method as recited in claim 24, wherein the step of verifying comprises verifying that the ID is accurate for the first assembly and the second assembly at the runtime.

26. One or more computer readable storage media having stored thereon a plurality of instructions that, when executed by a computing device having one or more processors, cause the one or more processors to implement the method as recited in claim 17.

* * * * *